United States Patent
Copley et al.

(10) Patent No.: US 6,456,708 B1
(45) Date of Patent: Sep. 24, 2002

(54) TRIGGERLESS NUMBER PORTABILITY SYSTEM AND METHOD

(75) Inventors: Jeffrey D. Copley, Garland; Richard E. Milne, Richardson, both of TX (US)

(73) Assignee: Alcatel USA Sourcing, L.P., Plano, TX (US)

(*) Notice: Subject to any disclaimer, the term of this patent is extended or adjusted under 35 U.S.C. 154(b) by 0 days.

(21) Appl. No.: 09/439,940

(22) Filed: Nov. 12, 1999

(51) Int. Cl.[7] .............................. H04M 3/42; H04M 7/00
(52) U.S. Cl. ............................ 379/207.02; 379/221.13; 379/229
(58) Field of Search ........................... 379/207.02, 219, 379/201.01, 220.01, 221.08–221.14, 229, 230; 370/351, 386, 389, 410, 426

(56) References Cited

U.S. PATENT DOCUMENTS

| | | | | |
|---|---|---|---|---|
| 5,943,411 A | * | 8/1999 | Houck et al. | 379/211.02 |
| 5,949,871 A | * | 9/1999 | Kabay et al. | 370/389 |
| 6,130,940 A | * | 10/2000 | Wong et al. | 379/201.01 |
| 2001/0040957 A1 | * | 11/2001 | McCann et al. | 379/221.13 |
| 2002/0054674 A1 | * | 5/2002 | Chang et al. | 379/207.02 |

* cited by examiner

Primary Examiner—Ahmad F. Matar
Assistant Examiner—Benny Q. Tieu
(74) Attorney, Agent, or Firm—Baker Botts, LLP; V. Lawrence Sewell; Craig A. Hoersten

(57) ABSTRACT

A method of providing local number portability capability includes the steps of capturing all initial address message transmitted on at least one predetermined SS7 link set to a signal transfer point, where each initial address message has a called party number parameter containing a dialed telephone number. A determination is made as to whether a predetermined FCI bit is set to one or zero and in response to the predetermined FCI bit being set to zero, the following steps are performed. A local number portability database lookup is done using the dialed telephone number to obtain a corresponding local routing number. The local routing number is then inserted into the called party number parameter of the initial address message, and the dialed telephone number is inserted into a generic address parameter of the initial address message. The predetermined FCI bit is then set to one. The initial address message is then sent to a destination specified by the called party number parameter.

3 Claims, 1 Drawing Sheet

TRIGGERLESS NUMBER PORTABILITY SYSTEM AND METHOD

TECHNICAL FIELD OF THE INVENTION

This invention is related in general to the field of telecommunications equipment. More particularly, the invention is related to a triggerless number portability system and method.

BACKGROUND OF THE INVENTION

Local number portability (LNP) is a relatively recent development in the telephone industry that allows a telephone service subscriber to change the telephone company or carrier providing the service without having to change telephone numbers. To enable local number portability, centralized regional entities called the number portability administration center (NPAC) have been established to store and update the location and associated data on the ported telephone numbers residing in the telecommunications switching network. In addition, each service provider is required to provide a local service management system (LSMS) that will accept from NPAC the data related to telephone numbers and associated LNP data and then propagate them to signal transfer points (STPs) serviced by each service provider.

In most cases, an LNP database query is required for call delivery in an LNP environment. The query consists of a Signalling System Number 7 (SS7) message sent from a query-originating switch to a network database to obtain the necessary routing information to route the call. Local number portability (LNP) is the process by which the dialed telephone number is translated by a database lookup process at the signal transfer point to a local routing number (LRN) of the destination. When a customer places a call to a ported number, the dialed number is sent in an SS7 query message to the LRN application residing in a signal transfer point. The LRN application replies by returning the LRN corresponding to the dialed telephone number, and the LRN is then used by the querying switch and subsequent switches to route the call to the network element that has the same network routing address (NRA) as the LRN.

Many wireless service providers do not have number portability routing capability, so they rely on another service provider to look up ported telephone numbers in its LRN database. In most instances, the service provider charges the wireless service provider significant fees for performing this service and substantially driving up the cost for wireless calls.

SUMMARY OF THE INVENTION

Accordingly, there is a need for a way to allow a service provider to query the LNP database without using an LNP query.

In accordance with the present invention, a triggerless local number portability system and method are provided which eliminates or substantially reduces the disadvantages associated with prior solutions.

In one aspect of the invention, a method of providing local number portability capability includes the steps of capturing all initial address messages transmitted on at least one predetermined SS7 link set to a signal transfer point, where each initial address message has a called party number parameter containing a dialed telephone number. A determination is made as to whether a predetermined FCI bit is set to one or zero and in response to the predetermined FCI bit being set to zero, the following steps are performed. A local number portability database lookup is done using the dialed telephone number to obtain a corresponding local routing number. If an LRN is found, the local routing number is then inserted into the called party number parameter of the initial address message, and the dialed telephone number is inserted into a generic address parameter of the initial address message. Whether or not an LRN was found, the predetermined FCI bit is then set to one. The initial address message is then sent to a destination specified by the information in the called party number parameter (CdPA).

In another aspect of the invention, a signal transfer point providing triggerless local number portability capability is provided. The signal transfer point captures all initial address message transmitted on a link set to the signal transfer point, where each initial address message has a called party number parameter containing a dialed telephone number A determination is made as to whether a predetermined FCI bit is set to one or zero and in response to the predetermined FCI bit being set to zero, the following steps are performed. A local number portability database lookup is done using the dialed telephone number to obtain a corresponding local routing number. If found, the local routing number is then inserted into the called party number parameter of the initial address message, and the dialed telephone number is inserted into a generic address parameter of the initial address message. Whether or not the LRN is found, the predetermined FCI bit is then set to one. The initial address message is then sent to a destination specified by the information in the called party number parameter.

In yet another aspect of the invention, a method of providing local number portability capability to a service switching point includes the steps of capturing all initial address message sent by the service switching point, where each initial address message having a called party number parameter containing a dialed telephone number, and determining whether a predetermined FCI bit is set to one or zero. In response to the predetermined FCI bit being set to zero, a local number portability database lookup is performed using the dialed telephone number and a corresponding local routing number therefor is obtained. If found, the local routing number is inserted into the called party number parameter of the initial address message, and the dialed telephone number is inserted into a generic address parameter of the initial address message. Whether or not the LRN was found, the predetermined FCI bit is then set to one. Finally, the initial address message is sent to a destination specified by the called party number parameter.

BRIEF DESCRIPTION OF THE DRAWINGS

For a better understanding of the present invention, reference may be made to the accompanying drawings, in which.

DETAILED DESCRIPTION OF THE INVENTION

Figure 1:
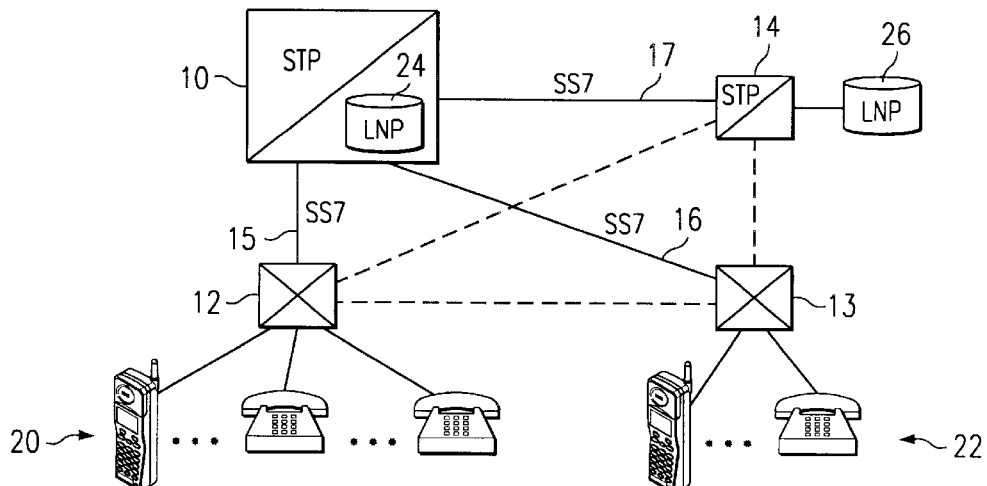
FIG. 1 is a block diagram of a portion of an intelligent network for triggerless number portability constructed according to an embodiment of the present invention.

FIG. 1 is a block diagram of a portion of an intelligent network for triggerless number portability constructed according to an embodiment of the present invention. A signal transfer point 10 is coupled to one or more service switching points 12 and 13 via Signalling System Number 7 (SS7) link sets 15 and 16. Signal transfer point 10 is also coupled to at least one other signal transfer point 14 via SS7 link sets 17. Service switching points 12 and 13 are further interconnected by trunks and may include a mobile services switching center (MSC) of a wireless service provider and one or more tandem switch. Service switching points 12 and 13 are coupled to or otherwise in communication with telecommunications equipment 20 and 22 of telephone service subscribers. In order to perform local number portability (LNP), signal transfer point 10 and 14 each have access to an LNP database 24 and 26, respectively. LNP databases 24 and 26 contain the ported telephone numbers and the corresponding local routing numbers.

If service switching point 12 of a service provider does not have LNP capabilities, it may have a business arrangement with another service provider who owns signal transfer point 14 to provide the LNP lookup in its LNP database 26 to obtain the local routing numbers. However, the cost of these types of arrangements are becoming cost prohibitive.

Figure 2:
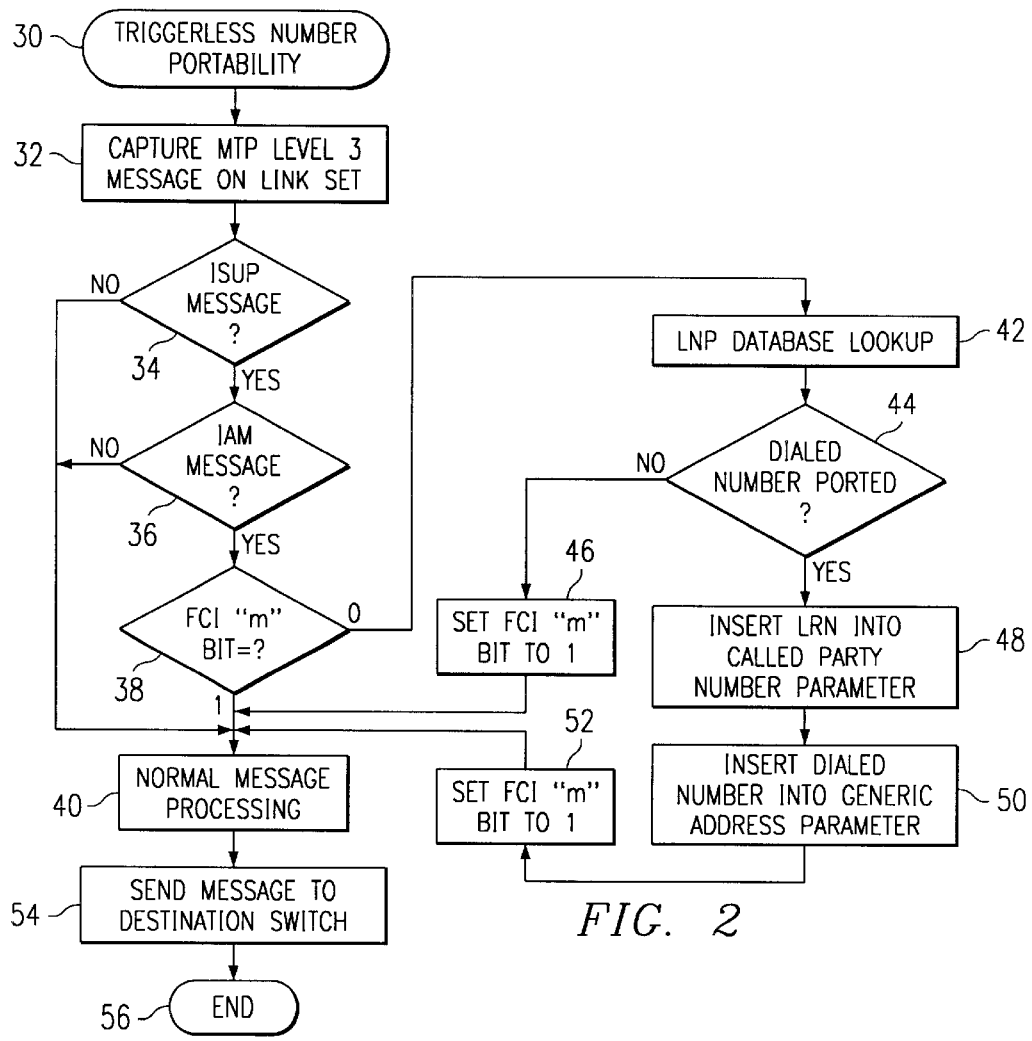
FIG. 2 is a flowchart of an exemplary embodiment of the triggerless number portability process constructed according to an embodiment of the present invention.

FIG. 2 is a flowchart of an exemplary embodiment of the triggerless number portability process 30 according to an embodiment of the present invention. Referring also to FIG. 1, the triggerless number portability is provisioned on specific link sets to signal transfer points 10, such as SS7 link sets 15 for example. On the provisioned link sets, all message transfer part (MTP) level 3 messages transmitted on link set 15 are captured, as shown in block 32. The user part portion of the captured message is then examined to determine if it is an integrated digital services network user part (ISUP) message, as shown in block 34. If it is not an ISUP message, normal message processing is performed, as shown in block 40. If it is an ISUP message, its message type field is examined to determine whether it is an initial address message (IAM), as shown in block 36. If it is not an IAM message, normal message processing is performed, as shown in block 40.

If it is an IAM message, then its forward call indicator (FCI) "m" bit is examined to determine whether it is set (1) or not set (0). The FCI "m" bit is indicative of whether an LNP database query has already been performed. If it is determined that the FCI "m" bit is equal to one (1), then it is indicative that an LNP database has already taken place and that normal message processing should be performed, as shown in block 40. If it is determined that the FCI "m" bit is not set or equals zero (0), then the dialed telephone number in the called party number is looked up in the LNP database to obtain the corresponding local routing number, as shown in block 42. If there is an entry in the LNP database with a corresponding local routing number, then the dialed number is ported, as determined in block 44. If the dialed number is not ported, the FCI "m" bit is set to one (1), as shown in block 46. If the dialed telephone number is ported, then the local routing number obtained from the LNP database is inserted into the called party number parameter of the message, and the original dialed telephone number is inserted into the generic address parameter of the message, as shown in blocks 48 and 50. The FCI "m" bit is then set to one (1), as shown in block 52. Normal message processing is then performed in block 40, and the message is sent to the destination switch according to the called party number, as shown in block 54. The process ends in block 56.

Upon receipt of the message at the destination switch, the destination switch performs normal number portability procedures. For example, it queries the LNP database if the FCI "m" bit is zero to obtain the local routing number and then routes the message accordingly. If the FCI "m" bit is one, the destination switch routes the call as indicated by the called party number parameter in the message.

The logic of triggerless number portability process 30 is summarized below:

| Case No. | FCI "m" Bit Value | Number Ported? | Insert LRN & GAP? | Set FCI "m" bit to 1 |
|---|---|---|---|---|
| 1 | 1 | — | — | — |
| 2 | 0 | Yes | Yes | Yes |
| 3 | 0 | No | No | Yes |

In many networks, a continuity message (COT) is sent after an SS7 message to check the integrity of the network. If such a message is captured, then it is held and sent to the destination switch after the processing of the IAM message is performed and transmitted.

Provisioned in this manner according to the present invention, a switch that does not have LNP query capabilities is able to complete call delivery to portable telephone numbers. The IAM message is captured by the signal transfer point and the LNP database lookup is done at the signal transfer point without an LNP query. Therefore, the present invention allows service providers to effectively implement LNP capabilities prior to deploying any switch LNP implementations.

Although several embodiments of the present invention and its advantages have been described in detail, it should be understood that mutations, changes, substitutions, transformations, modifications, variations, and alterations can be made therein without departing from the teachings of the present invention, the spirit and scope of the invention being set forth by the appended claims.

What is claimed is:

1. A method of providing local number portability capability, comprising:

capturing all MTP level 3 messages transmitted on at least one predetermined SS7 link set to a signal transfer point, each MTP level 3 message includes a user part portion and a message type field;

determining if the user part portion of the captured MTP level 3 message is an integrated digital service network user part (ISUP);

if the determination is made that the user part portion of the captured MTP level 3 message is an ISL RP, then determining if the message type field of the captured MTP level 3 message is an initial address message (IAM), each IAM having a called party number parameter containing a dialed telephone number;

if the determination is made that the message type field of the captured MTP level 3 message is an IAM, then determining whether a predetermined Forward Call Indicator (FCI) bit is set to one or zero and in response to the predetermined FCI bit being set to zero:

performing a local number portability database lookup using the dialed telephone number and obtaining a corresponding local routing number therefor;

inserting the local routing number into the called party number parameter of the initial address message;

inserting the dialed telephone number into a generic address parameter of the initial address message; and setting the predetermined FCI bit to one; and sending the initial address message to a destination specified by the called party number parameter.

2. The method, as set forth in claim 1, further comprising:

determining whether the dialed telephone number has a corresponding local routing number in the local number portability database; and setting the predetermined FCI bit to one in response to the dialed number having a corresponding local routing number.

3. A computer-readable medium storing the method as set forth in claim 1.

* * * * *